June 21, 1927.
L. E. LA BRIE
OPERATING DEVICE
Filed Dec. 23, 1926
1,632,794
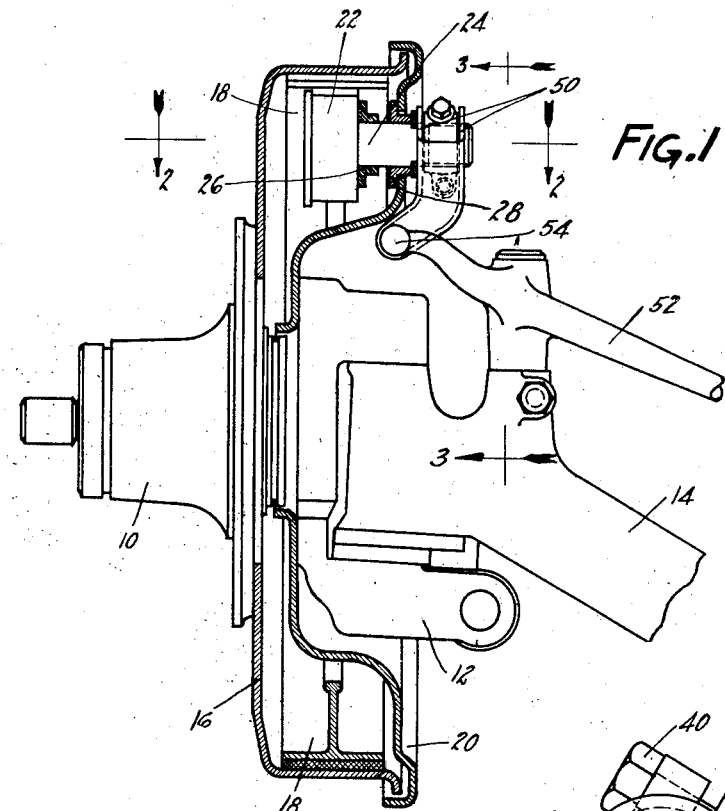
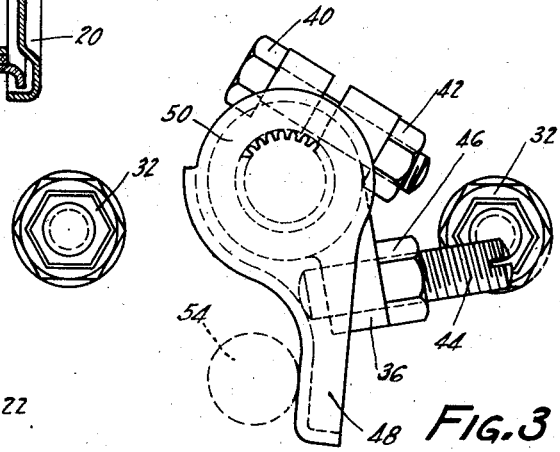
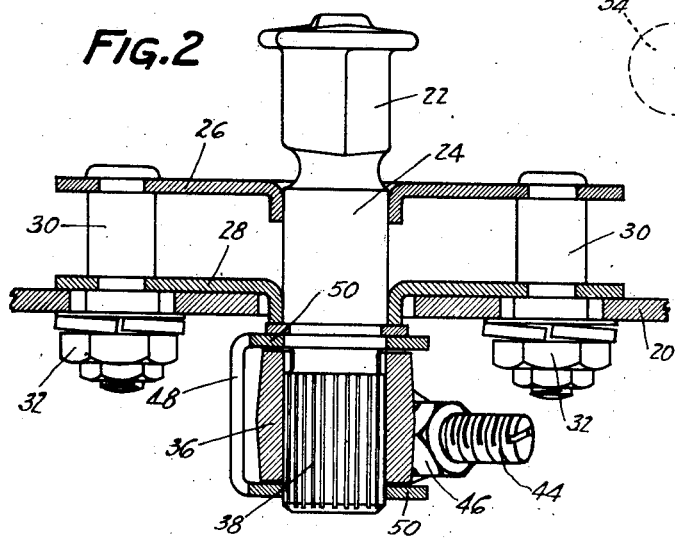
INVENTOR
LUDGER E. LA BRIE
BY
*M. W. McConkey*
ATTORNEY Patented June 21, 1927.

1,632,794

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

OPERATING DEVICE.

Application filed December 23, 1926. Serial No. 156,610.

This invention relates to operating devices for brakes and similar mechanisms, and is illustrated as embodied in a device for rocking the cam-shaft of a front wheel brake. An object of the invention is to provide an inexpensive operating device which is capable of easy adjustment.

In one desirable arrangement, the device includes an arm fixed on the brake-applying shaft, together with a channel-shaped arm (which may be pressed from sheet steel) having side flanges loosely mounted on the shaft on opposite sides of the fixed arm, together with a thrust device carried by one arm and engaging the other. In the illustrated arrangement, the thrust device is a set-screw carried by the fixed arm and adjustable therein and engaging the bottom of the channel of the loosely mounted arm. Brake-applying force is transmitted to the fixed arm through the set-screw or its equivalent by means such as a lever engaging the opposite side of the loosely mounted arm.

The above and other objects and features of the invention, including various combinations of parts and desirable particular constructions, will be apparent from the following description of the illustrative embodiments shown in the accompanying drawings, in which:

Figure 1 is a vertical section through the left front brake of an automoibile looking toward the front of the car and showing the operating device in rear elevation;

Figure 2 is a section through the operating device on the line 2—2 of Figure 1; and Figure 3 is an elevation of the operating device looking in the direction of the arrows 3—3 in Figure 1.

The parts shown in Figure 1 include a wheel, the hub of which appears at 10, and which is rotatably mounted on the spindle of a front wheel knuckle 12 which is swivelled by the usual king-pin or the like, at one end of the front axle 14. The brake includes a drum 16 rotating with the wheel, and arranged to be engaged by shoes 18 mounted in any desired manner on a stationary support or backing plate 20 carried by the knuckle 12. The shoes 18 may be expanded against the drum 16 by means shown as a cam 22 having a shaft 24 journalled in bearings formed in spaced plates or supports 26 and 28 connected by posts 30 projecting through relatively large openings in the backing plate 20. Nuts 32 threaded on the ends of the posts 30 clamp the supports frictionally to the backing plate 20 and normally hold them stationary, although they permit them to shift when the brake is applied, if necessary, to allow the cam 22 to center itself with respect to the brake shoes 18. The present invention relates to the device for rocking the cam-shaft 24 or its equivalent.

This novel operating device includes an arm 36, shown as a forging, having a split hub splined to embrace the splined portion 38 on the end of shaft 24 and contracted about the shaft by a clamp bolt 40 on which is threaded a nut 42 which can be tightened up to secure the arm 38 firmly in place on the shaft. The arm 36 carries a thrust device, shown as a set-screw 44, adjustably threaded in the end of the arm, and arranged to be locked in adjusted position by a lock-nut 46, and which engages the inside of a channel-shaped arm 48 which is formed as a stamping of sheet steel and which has flanges 50 loosely embracing the shaft 24 on opposite sides of the arm 36.

The brake is applied by means shown as a lever 52 fulcrumed on the axle 14 and shown as formed at its end with an integral ball 54 engaging the end of the arm 48 on the side opposite the thrust device 44. Preferably, when the brake is applied, the center of the ball 54 is in or immediately adjacent the swivelling axis of the wheel so that swivelling the wheel in steering is not interfered with by the brake-operating mechanism.

While one illustrative embodiment of the invention has been described in detail, it is not my intention to limit its scope to that particular embodiment or otherwise than by the terms of the appended claims.

I claim:

1. An operating device comprising, in combination, a shaft, an arm fixed on the shaft, a channel-shaped arm having side flanges loosely mounted on the shaft on opposite sides of the fixed arm and partially enclosing the fixed arm, and a thrust device adjustably engaging the fixed arm and the part of the channel-shaped arm between the side flanges.

2. An operating device comprising, in combination, a shaft, an arm fixed on the shaft, a channel-shaped arm having side flanges loosely mounted on the shaft on opposite sides of the fixed arm and partially enclosing the fixed arm, and a set-screw carried by the fixed arm and engaging the bottom of the channel-shaped arm between the side flanges.

3. An operating device comprising, in combination, a shaft, an arm fixed on the shaft, a channel-shaped arm having side flanges loosely mounted on the shaft on opposite sides of the fixed arm and partially enclosing the fixed arm, and a thrust device adjustably engaging the fixed arm and the part of the channel-shaped arm between the side flanges, together with an operating lever having disconnected thrust engagement with the part of the channel-shaped arm opposite said thrust device.

4. An operating device comprising, in combination, a shaft, an arm fixed on the shaft, a channel-shaped arm having side flanges loosely mounted on the shaft on opposite sides of the fixed arm and partially enclosing the fixed arm, and a thrust device adjustably engaging the fixed arm and the part of the channel-shaped arm between the side flanges, together with an operating lever having disconnected thrust engagement with the part of the channel-shaped arm opposite said set-screw.

5. An operating device comprising, in combination, a shaft, an arm fixed on the shaft, a channel-shaped pressed-metal arm having side flanges loosely mounted on the shaft on opposite sides of the fixed arm and partially enclosing the fixed arm, and a thrust device adjustably engaging the fixed arm and the part of the channel-shaped arm between the side flanges.

In testimony whereof, I have hereunto signed my name.

LUDGER E. LA BRIE.